Oct. 27, 1959 W. R. JOHNSON 2,910,035
FOOT OPERATED MARINE PADDLE WHEEL SYSTEM
Filed Nov. 12, 1957 2 Sheets-Sheet 1

William R. Johnson
INVENTOR.

BY *Clarence A. O'Brien*
*and Harvey B. Jacobson*
Attorneys

Oct. 27, 1959    W. R. JOHNSON    2,910,035
FOOT OPERATED MARINE PADDLE WHEEL SYSTEM
Filed Nov. 12, 1957    2 Sheets-Sheet 2
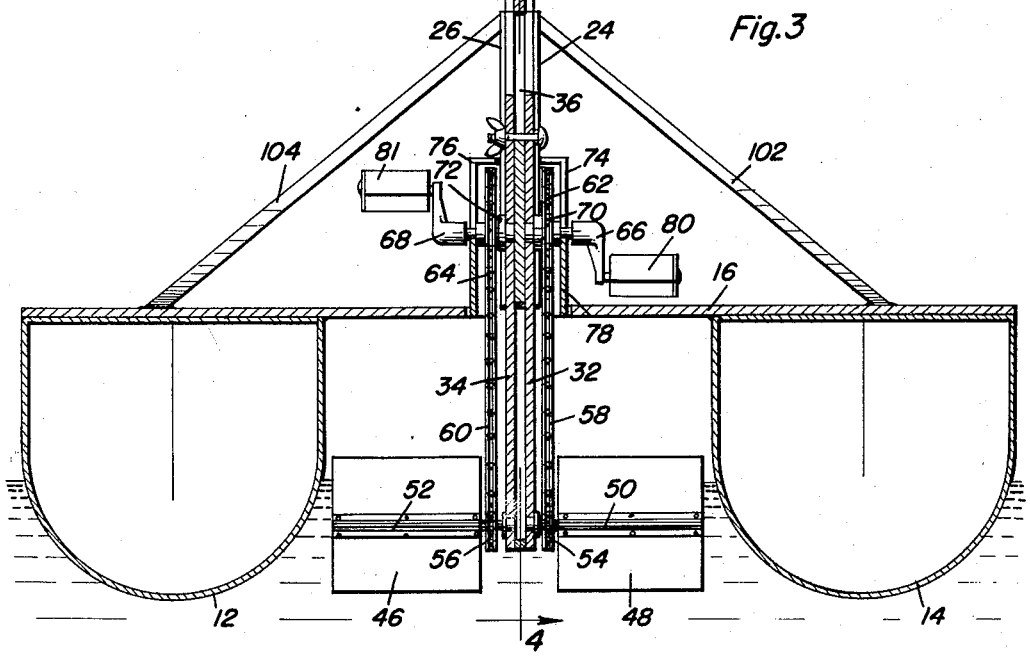
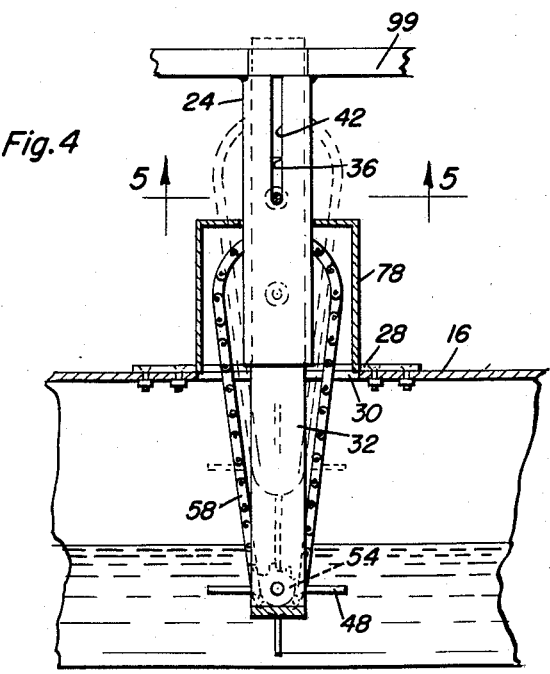
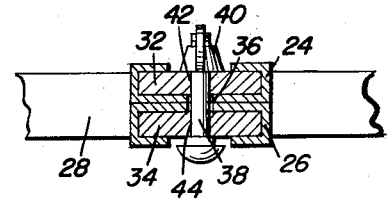
William R. Johnson
INVENTOR.

United States Patent Office 2,910,035
Patented Oct. 27, 1959

2,910,035

FOOT OPERATED MARINE PADDLE WHEEL SYSTEM

William R. Johnson, Eudora, Ark.

Application November 12, 1957, Serial No. 695,694

1 Claim. (Cl. 115—26)

This invention relates to a fishing rig which enables a fisherman to select between motor power and manual power, depending on the exigencies of the occasion. In order to go to or return from a fishing spot, the motor is used. But, in order to quietly move about in a restricted area, it is suggested that the manual power be used.

My invention entails one or more floats that have provision for a motor and provision for foot pedals. The pedals operate paddles on opposite sides of the center line of the boat and each is independent of the other. In this way, directional control is obtained. By operating the pedal on the starboard side, the boat can be made to turn in one direction. By operating the pedal on the port side, the boat can be made to turn in the opposite direction. In addition, the boat can be maneuvered in a fore and aft direction, depending on the direction of rotation of the pedals.

Accordingly, it is a further object of the invention to provide a fishing boat which has foot operated means for maneuvering the boat either to the port, starboard, fore or aft direction without having to use his hands. Accordingly, the hands of the fisherman are relieved of all duties except those which he chooses, for example, fishing, smoking, etc.

One of the features of the invention is the structural organization by which the pedals and paddles, together with the means drivingly connecting the pedals and paddles, are supported. The paddles are capable of being retracted from the water so that they will provide no drag and so that they will not become damaged when the boat is operated by the outboard motor. They are easily returned to the lowered position so that the paddles are below the water surface and easily elevated.

Another important feature of my invention is the handy and convenient tray located near the seat of the water vehicle. This can hold various and sundry items, such as fish hooks, lures, bait, other containers such as lunchboxes, etc. Yet, it is positioned in such a way that it will not interfere with the ordinary fishing operations.

I have been made aware of prior water vehicles which have structures very much like portions of tandem or single bicycle frames mounted on floats. These water vehicles are not practical for fishing operations for the reason that they have no practical range. It requires the assistance of an outboard motor to reach many fishing areas. After arriving at the fishing area, the outboard motor has to be substituted by something very quiet, otherwise the fish will be driven away. My invention has for one of its objects the provision of the multi-power options where each are capable of being adjusted to inoperative positions and adjusted to the operative positions depending on the demands made by the particular conditions existing at the moment.

Other prior water vehicles have had controls that would be found on other ordinary boats, for example, rudders. I obtain maneuverability much more directly and with considerably more alacrity by the unique system which I employ for the manual propulsion feature.

Other objects and features of importance will become evident in following the description of the illustrated form of the invention.

Figure 3 is a cross sectional view taken transversely of the boat in Figure 1.

Figure 4 is a fragmentary sectional view taken on the line 4—4 of Figure 3 and showing principally the means for manually propelling the boat.

Figure 5 is a transverse sectional view taken on the line 5—5 of Figure 4.

In the accompanying drawings there is a water vehicle 10 which exemplifies the principles of the invention. This vehicle is constructed of two floats 12 and 14 connected together rigidly by a platform 16. The upper surfaces of the floats are flat (Figure 5) and provide an excellent surface on which to support the floor 16. Although I have illustrated two floats 12 and 14, it is to be clearly understood that the principles of my invention can be practiced with one or more floats. It is specifically contemplated to use three floats in triangular formation or four floats, two being in tandem on each side of the boat.

Figure 1:
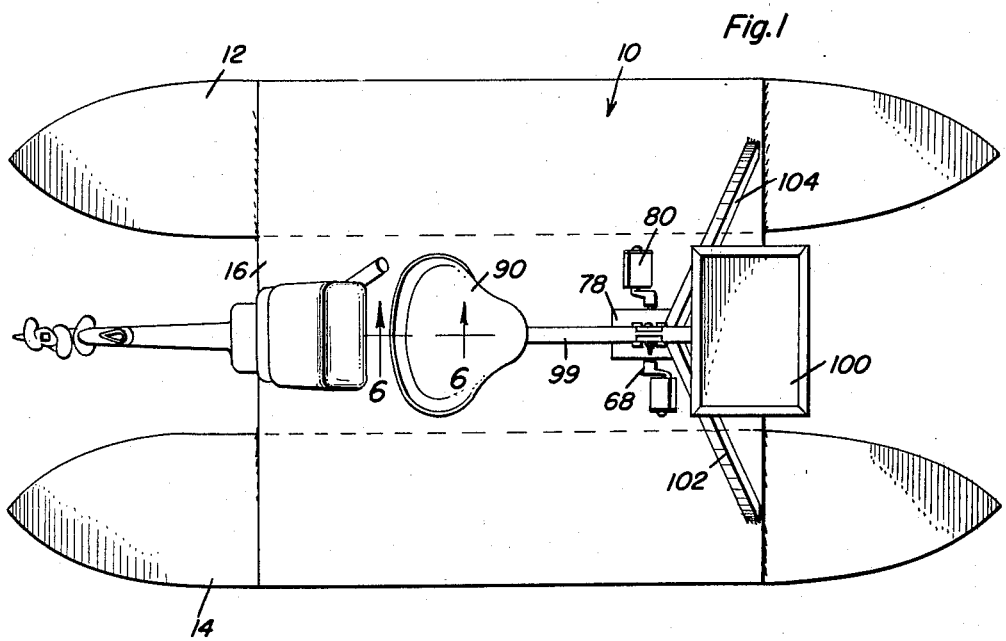
Figure 1 is a top view of one embodiment of the invention.
Figure 2:
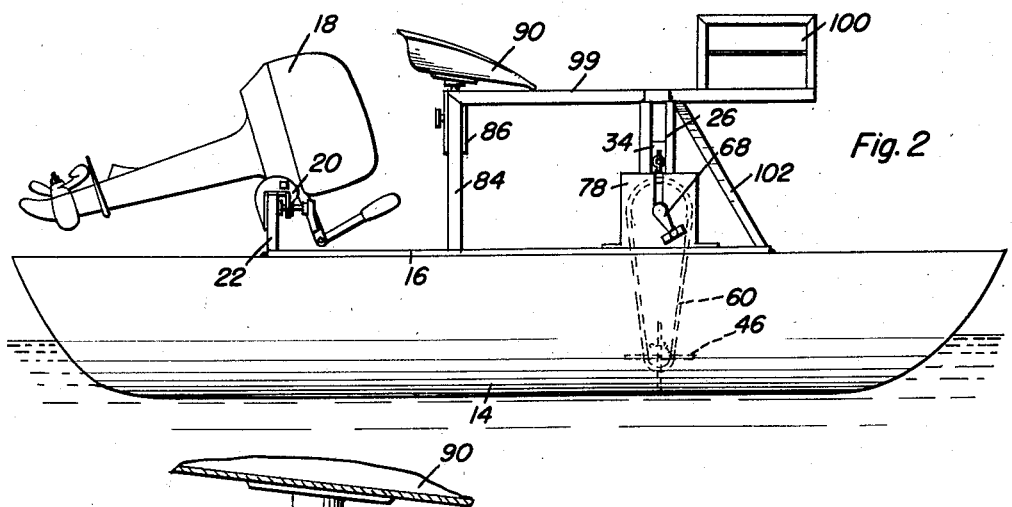
Figure 2 is a side view of the boat in Figure 1.
Figure 6:
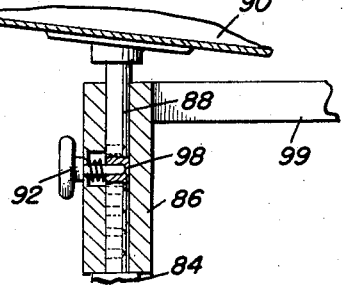
Figure 6 is an enlarged fragmentary sectional view showing the means by which to adjust the height of the seat and taken on the line 6—6 of Figure 1.

An outboard motor 18 is used to propel boat 10. The outboard motor is of ordinary construction and has a conventional outboard motor clamp 20 on it attaching the outboard motor to an upstanding support 22 which functions as a transom. The support is secured to the floor 16 and is located between the separated floats 14 and 12. The conventional clamp 20 is used to swing the outboard motor to the raised, inoperative position (Figure 2) or to the lowered operative position which would have the propeller of the outboard motor submerged.

A pair of vertical channels 24 and 26 (Figure 5) are welded or otherwise secured together with their back surfaces in contact. They are welded or otherwise secured to mounting plate 28 that is bolted or connected by other fasteners to floor 16 and over an opening 30 therein. A pair of slides 32 and 34 are mounted in the channels 24 and 26 and are constrained to movement longitudinally of the channels. Accordingly, the channels function as rails with the slides mounted in them. The back walls of the channels have an aperture 36 through which a bolt 38 is passed. A wing nut 40 is on the end of the bolt, this bolt also passing through slots 42 and 44 in the slides. The lower extremities of the slides are welded or otherwise secured together so that they move in unison. The slides can be moved to selected, adjusted positions in the tracks and held in place by the nut 40 and the bolt 38. Should it be desired, the aperture 36 may be in the form of a slot (Figure 3) and the openings in the slides 32 and 34 may be in the form of holes and the same results will be achieved. The purpose is to have the slides 32 and 34 moved to selected positions so that the two paddles 46 and 48 can be lifted from the water or lowered into the water.

The paddles are mounted on shafts 50 and 52 and have a number of blades protruding laterally therefrom. Sprockets 54 and 56 are fixed to the shafts and have endless chains 58 and 60 entrained around them. These chains are also entrained around sprockets 62 and 64 attached to the inner ends of cranks 66 and 68. The cranks are mounted for rotation in bearings 70 and 72 that are in contact with or are otherwise associated with the slides 32 and 34. The cranks pass through slots 74 and 76 in a protective housing 78 that covers opening 30. The upper ends of the slides and their channels 24 and 26 pass through an opening in the top of the housing. Hence, upon adjustment of the slides the two paddles which are independently operated by the pedals 80 and 81 on cranks 66 and 68 can be raised and lowered. The operation of the paddles and the results achieved by the operation have been described previously.

A stand consisting of a post 84 is secured to floor 16 and has a sleeve 86 at its upper end. The sleeve accommodates rod 88 on the upper edge of which there is a seat 90. A spring-pressed pin 92 is carried by sleeve 86 and is projected into one opening 98 of the group of openings in the rod 88. This adjusts the height of the seat.

A horizontal brace 99 is attached to sleeve 86 and has a container 100 at one end. This container 100 can support various and sundry items and is located in advance of the fisherman who would be located on seat 90. Legs 102 and 104 extend diagonally from brace 99 to the floor 16 to provide the necessary rigidity of construction not only for the seat and container 100, but also for the upstanding support made up of channels 24 and 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a catamaran boat including a pair of spaced apart side floats and a floor on said floats connecting the same together, propelling means for the boat comprising a pair of upright opposite members vertically movably extending through said floor at opposite sides of the longitudinal center of the boat and having lower ends below said floor connected together for vertical movement of said members in unison, a pair of independently operative paddle wheels rotatably mounted on the lower ends of said members respectively, and extending oppositely outwardly from said members, a pair of independently operative foot pedals revolubly mounted on said members above said floor and extending oppositely outwardly from said members, drive means operatively connecting each foot pedal to one of the paddle wheels, a pair of upright channel elements rising from and fixed to said floor in opposite relation and oppositely opening position with respect to each other and in which said members are vertically slidably adjustable to adjust said paddle wheels and pedals upwardly and downwardly in unison, and coacting clamping devices on said members and elements respectively, for clamping the members to said elements in different adjusted position of said members.

References Cited in the file of this patent

UNITED STATES PATENTS

| | | |
|---|---|---|
| 206,346 | Moore | July 23, 1878 |
| 393,221 | Dolliver | Nov. 20, 1888 |
| 424,026 | Riexinger | Mar. 25, 1890 |
| 1,761,884 | Gorski | June 3, 1930 |
| 1,920,391 | Herwig | July 1, 1933 |
| 2,745,118 | Potts et al. | May 15, 1956 |

OTHER REFERENCES

"Boat Builder's Handbook," volume 6, 1956.